March 10, 1953     I. I. SIKORSKY     2,630,989
LANDING GEAR FOR USE ON INCLINED SURFACES
Filed Nov. 23, 1948
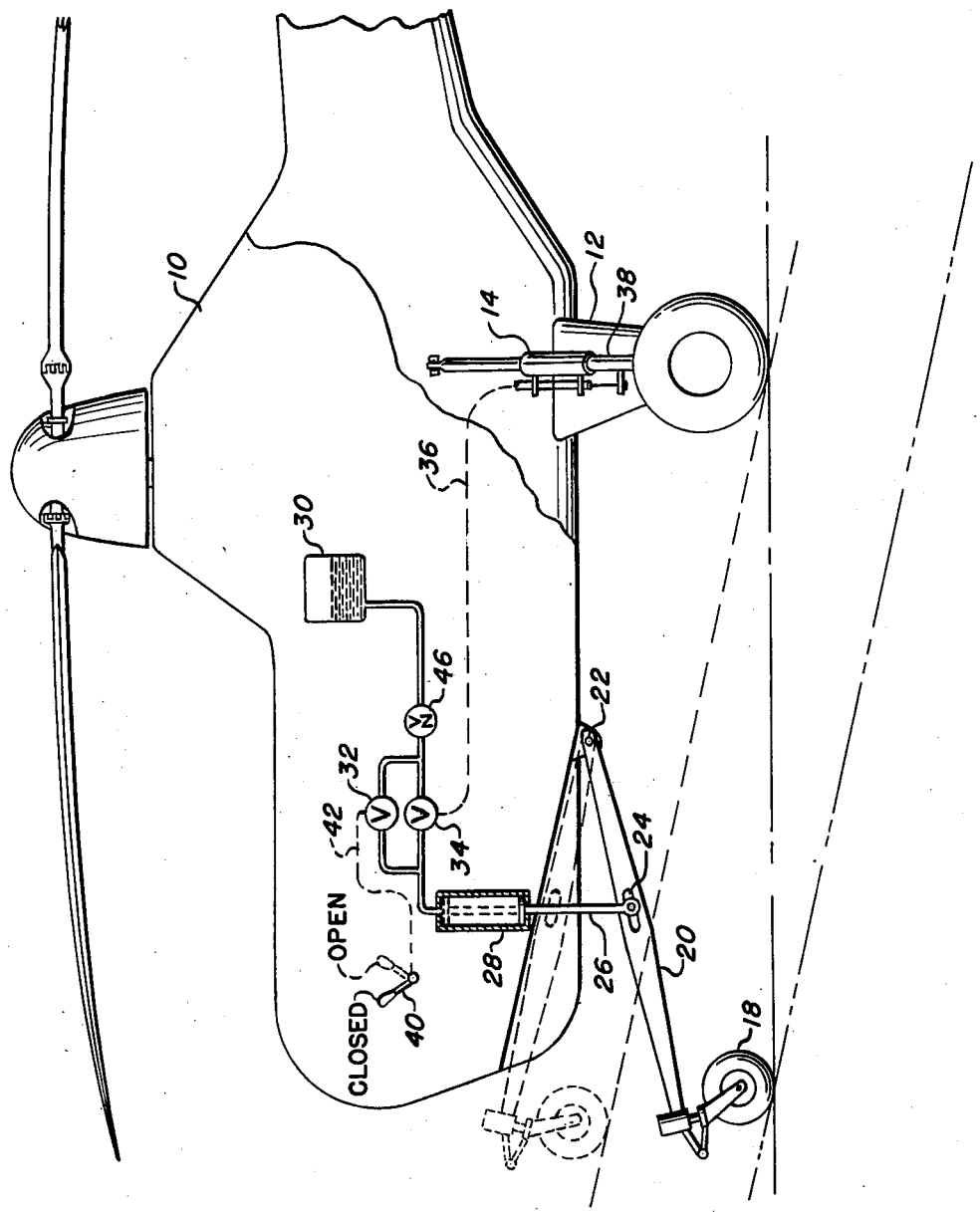
IGOR I. SIKORSKY
INVENTOR
BY M. B. Tasker
ATTORNEY Patented Mar. 10, 1953

2,630,989

UNITED STATES PATENT OFFICE 2,630,989

LANDING GEAR FOR USE ON INCLINED SURFACES

Igor I. Sikorsky, Bridgeport, Conn., assignor to United Aircraft Corporation, East Hartford, Conn., a corporation of Delaware Application November 23, 1948, Serial No. 61,584

8 Claims. (Cl. 244—102)

This invention relates to helicopters and more specifically to a multi-position helicopter landing gear for permitting landings on irregular or sloped terrain.

In helicopter operation, for example in rescue work, it is often necessary to make landings on rough or sloping ground.

Therefore, it is an object of this invention to increase the versatility of helicopters or similar direct lift aircraft which are capable of landing vertically to permit operation from rough or sloping ground such as hillsides.

It is another object of this invention to provide a landing gear arrangement for helicopters whereby in making landings on a slope the up-slope landing gear member is freely movable toward a retracted position and can be locked in any position of retraction so as to permit the fuselage and rotor of the helicopter to remain horizontal.

A further object of this invention is to provide a helicopter landing gear whereby the nose gear or the up-slope gear member is retractable upon landing and where such gear is automatically locked to properly support the aircraft upon the ground engagement of the main gear.

A still further object of this invention is to provide a nose gear of the type described whereby the gear may be locked in any desired position of retraction by a pilot operated mechanism.

These and other objects of this invention will become readily apparent from the following detail description of the drawing.

In this drawing,

The figure is a side elevation of a helicopter fuselage indicating in partial schematic the landing gear arrangement and operating mechanism according to this invention.

Referring to the figure, the numeral 10 indicates the fuselage of a helicopter having a main landing gear 12 including a telescoping shock strut 14. A nose wheel 18 is also provided including the usual shock absorbing units. The nose wheel 18 is carried by the free end of a member 20 which has its other end pivotally connected at 22 to the fuselage 10. Intermediate its ends, the member 20 carries a slotted fitting 24 thereby providing a connection for the rod 26 which is attached to the piston of a hydraulic piston and cylinder mechanism 28. Thus it is obvious that with this arrangement, the nose wheel 18 and the member 20 are free to move from the full line to the dotted line position shown in the figure and during any such motion of the member 20 will correspondingly impart movement to the piston of mechanism 28.

Mechanism 28 is operatively connected to a hydraulic system consisting of a reservoir 30, and the shut-off valves 32 and 34, which are connected in parallel in the hydraulic lines between the cylinder of mechanism 28 and the reservoir 30. Movements of the piston between the full line and the dotted line position shown are controlled by opening and closing either of the valves 32 and 34. The valve 34 is operated by a flexible control cable such as the Bowden wire 36 which is connected to the movable element 38 of the shock strut 14 on the landing gear 12 while the valve 32 is manually operated by a pilot control handle 40 via a similar control cable 42. The valve 34 may be spring loaded in order to positively hold it in an open position when the weight of the aircraft is not resting on the main gear, i. e., during flight. On the other hand the valve 32 may be spring biased toward a closed position so that if the aircraft is resting on the ground both valves 32 and 34 will be closed so as to prevent the member 20 from retracting.

In operation then, when the helicopter is in flight, the movable member 38 on the shock strut 14 will be in the extended position and the control cable 36 will hold the valve 34 in the open position. The nose wheel 18 at the same time will assume a fully extended position as indicated in the full lines shown in the drawing. Upon approaching a slope or hillside the pilot directs the helicopter so that the nose usually is pointed up-hill. As the aircraft nears the ground the nose gear will be the first to engage and will freely move upwardly toward a retracted position since the piston and cylinder mechanism 28 is able to force fluid toward the reservoir 30 through the open valve 34. As the main gear engages the ground and the weight of the helicopter is placed thereon, the movable member 38 will telescope within the shock strut 14 thereby moving the control wire 36 to close the valve 34 and prevent any additional fluid from being forced back to the reservoir. As a result, the nose gear member 20 will become locked in position so that the fuselage 10 will remain horizontal. It is obvious then that thereafter upon application of the brakes by the pilot the helicopter will remain in a substantially horizontal position on the slope.

In the event that the pilot wishes for any reason to permit the nose gear to retract he can momentarily move the control handle 40 to open the valve 32. Such retraction may be desirable whether on level ground or on a sloping surface.

In order to limit or vary the speed of retraction of the nose gear, a manually adjustable needle valve 46 may be included in the hydraulic line on the reservoir side of the valves 32 and 34 to meter the flow of fluid being forced back into the reservoir.

As a result of this invention it is apparent that a landing gear mechanism has been provided for helicopters or similar direct lift aircraft to increase the versatility thereof by permitting landings to be made on almost any type of terrain while still maintaining the fuselage of the aircraft in a substantially horizontal position.

Although only one embodiment of this invention has been described and shown herein, it is obvious that various modifications and changes can be made in the shape and the arrangement of the parts without materially departing from the scope of this novel concept.

1. Landing gear for direct lift aircraft having a fuselage, an arm pivoted adjacent one end on said fuselage and carrying a ground engaging member adjacent its free end, control means between said arm and said fuselage for controlling the pivotal movement of said arm following ground engagement of said member, a second ground engaging member spaced from said arm carried member, and means operably connected between said second ground engaging member and said control means and responsive to ground engagement of said second member to actuate said control means to lock said arm in its then existing position.

2. In a direct lift aircraft, a fuselage, two main landing gear, each having a telescoping shock strut connecting it with said fuselage, a nose gear connected with said fuselage having means for yieldingly supporting its ground engaging member on said fuselage including a cylinder adapted to contain a body of fluid and having means including a valve for venting said fluid, and means operatively connecting said valve and one of said main landing gear and responsive to ground engagement of the ground engaging member of said one main gear for closing said valve and arresting said fuselage in its then existing position relative to said nose gear.

3. In a direct lift aircraft, a fuselage, two main landing gear connected with said fuselage, each including a ground engaging member and a strut which is retracted and extended as the ground engaging member of the gear contacts and leaves the ground respectively, a nose gear connected with said fuselage having a ground engaging member and means for yieldingly supporting its ground engaging member relative to said fuselage including a body of fluid and a valve controlling the venting of said fluid, and means operatively connecting said fuselage and one of said main gear and responsive to ground engagement of the ground engaging member of said one main gear for closing said valve and fixing said nose gear in its then existing position relative to said fuselage.

4. In a direct lift aircraft, a fuselage, two main landing gear connected to said fuselage, each including a ground engaging member and an element which moves relative to said fuselage upon engagement of its ground engaging member with the ground, a nose gear connected to said fuselage having a ground engaging member and means for yieldingly supporting its ground engaging member relative to said fuselage including a container filled with fluid and having a vent passage, a valve in said vent passage controlling the venting of said fluid, and means operatively connecting said valve and one of said main gear and responsive to movement of said element on said one main gear for closing said valve.

5. In a helicopter adapted to descend generally vertically and land on sloping terrain, an elongated fuselage, alighting gear including two ground engaging members suspended at spaced points along the length of said fuselage, means including a shock strut for supporting one of said members on said fuselage for progressive yielding movement relative to said fuselage, means for supporting the other of said members on said fuselage for progressive yielding movement relative to said fuselage as the helicopter descends following engagement of said other member with the upper portion of the slope, means for locking said supporting means of said other member, and means operatively connecting said locking means and said one member and operated automatically upon initial ground engagement of said one member for actuating said locking means and arresting the yielding movement of said fuselage relative to said other member in a substantially horizontal position of said fuselage.

6. In a helicopter having an elongated fuselage, a rotor rotatable about a generally upright axis in said fuselage, a pair of main landing gear units disposed on opposite sides of said fuselage adjacent the lateral plane including said axis, an auxiliary landing gear unit spaced a substantial distance in a fore and aft direction from said plane, means for yieldingly supporting said main landing gear units on said fuselage, means for yieldingly supporting said auxiliary unit on said fuselage including a cylinder element adapted to contain fluid and having a passageway for venting said fluid and a piston element disposed in said cylinder, one of said elements being connected to said fuselage and the other to said auxiliary unit, whereby fluid is displaced from said cylinder through said passageway as said auxiliary unit yields relative to said fuselage under the load of said helicopter following ground engagement of said auxiliary unit, means for locking said auxiliary unit against further yielding movement including valve means controlling said venting passageway, and means operatively connecting said valve means and one of said main landing gear units and actuated by said one landing gear unit as the latter yields under load relative to said fuselage for closing said valve means.

7. In a direct lift aircraft, a fuselage, main landing gear including side by side ground engaging members, each connected to said fuselage by yielding shock absorbing means, said main landing gear being in a transverse plane located aft of the center of gravity of the aircraft, an auxiliary landing gear for supporting a portion of the load of said aircraft located forward of said center of gravity at a point spaced from said plane, said auxiliary landing gear including a ground engaging member and means connecting the latter to said fuselage including a piston and a cylinder filled with fluid and having a vent passage, means for normally locating said piston in one end of said cylinder, means for venting fluid from said cylinder including a valve for controlling the venting thereof as said piston moves relative to said cylinder in response to ground engagement of said ground engaging member of said auxiliary gear, means for arresting the movement of said auxiliary gear comprising means operatively connecting said control valve and one of said main landing gear and responsive to yielding of the shock absorbing means of said one landing gear relative to said fuselage for closing said valve, and manually controlled valve means operatively connected with said vent passage for controlling the movement of said fuselage toward said auxiliary landing gear while both said main and auxiliary landing gear are in ground engagement.

8. In a helicopter having an elongated fuselage, a rotor rotatable about a generally upright axis in said fuselage, a pair of side-by-side main landing gear units disposed on opposite sides of said fuselage adjacent the lateral plane including said axis, an auxiliary landing gear unit spaced a substantial distance forward of said plane, means for yieldingly supporting said main landing gear units on said fuselage, means for connecting said auxiliary unit to said fuselage including a cylinder adapted to contain fluid and having a passageway adjacent one end for venting fluid and a piston normally disposed in the other end of said cylinder, whereby fluid is displaced from said cylinder through said passageway as said auxiliary landing unit yields relative to said fuselage under the load of said helicopter following ground engagement, means including a valve operatively connected with one of said main units and actuated by said one of said main units as the latter yields under load relative to said fuselage for automatically closing said passageway and locking said auxiliary unit against further yielding movement, manual means for venting fluid from said cylinder when both said main and auxiliary landing gear units are in ground engagement, and means for controlling the rate of flow of the vented fluid from said cylinder to vary the speed of movement of said auxiliary landing gear unit toward said fuselage under said automatic control.

IGOR I. SIKORSKY.

REFERENCES CITED

The following references are of record in the file of this patent:

UNITED STATES PATENTS

| Number | Name | Date |
| --- | --- | --- |
| 1,884,596 | Cierva | Oct. 25, 1932 |
| 1,918,426 | Radnor | July 18, 1933 |
| 2,101,611 | Dowty | Dec. 7, 1937 |
| 2,365,424 | Mercier | Dec. 19, 1944 |
| 2,368,501 | Thompson | Jan. 30, 1945 |
| 2,368,855 | Levy | Feb. 6, 1945 |
| 2,381,842 | Schwend | Aug. 7, 1945 |
| 2,387,713 | Bradford | Oct. 30, 1945 |
| 2,519,522 | Wells | Aug. 22, 1950 |

FOREIGN PATENTS

| Number | Country | Date |
| --- | --- | --- |
| 505,263 | Great Britain | May 4, 1939 |
| 819,026 | France | June 28, 1937 |